Jan. 25, 1927.　　　　　　　　　　　　　　　　1,615,640
J. M. LONDON
LOADING MACHINE
Filed July 28, 1923　　　2 Sheets-Sheet 2

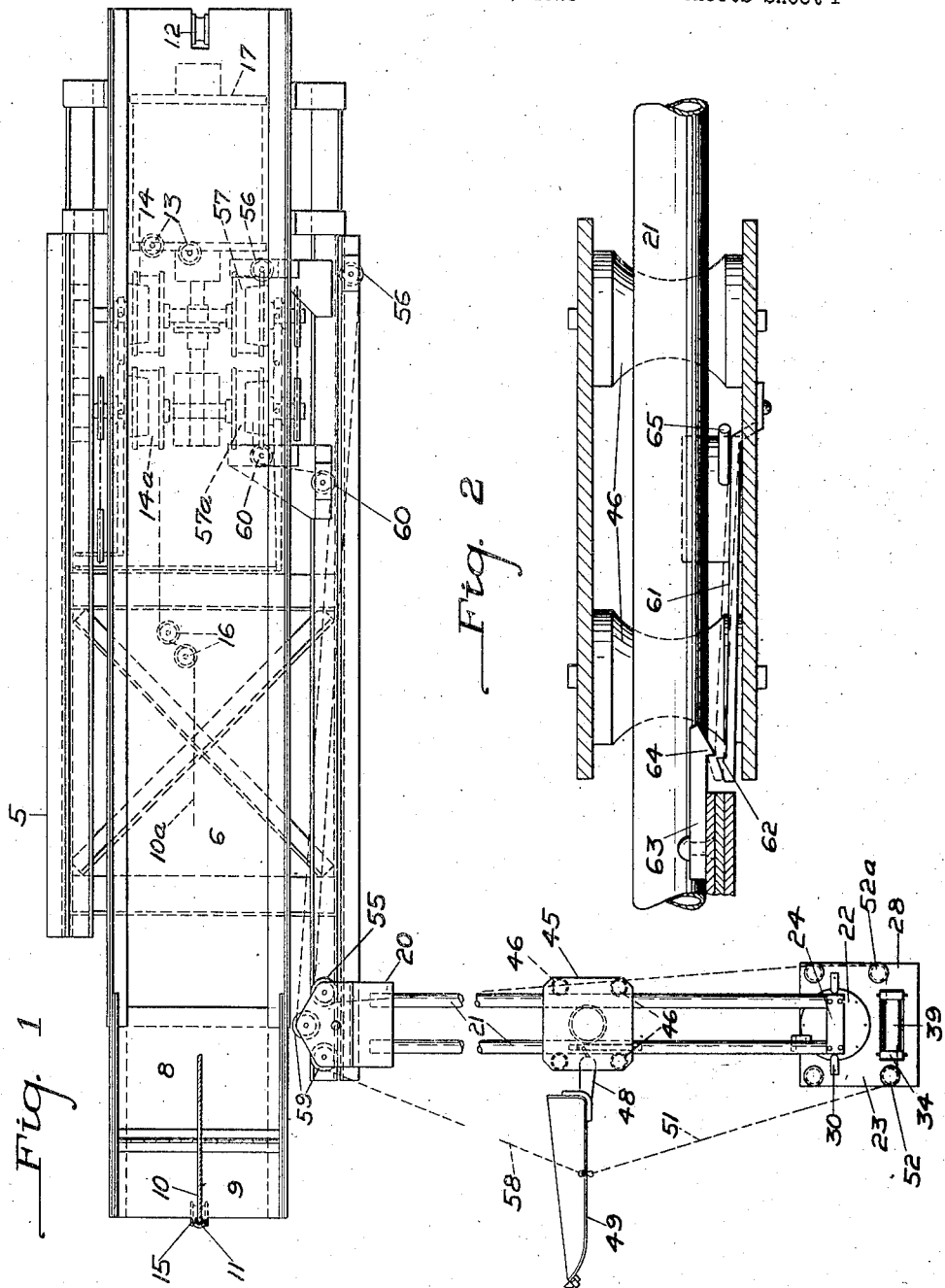

INVENTOR
Jacob M. London
by Clarke & Doolittle
his attorneys.

Patented Jan. 25, 1927.

1,615,640

UNITED STATES PATENT OFFICE.

JACOB M. LONDON, OF BROOKVILLE, PENNSYLVANIA, ASSIGNOR OF ONE-HALF TO GEORGE M. CRAWFORD, OF PITTSBURGH, PENNSYLVANIA.

LOADING MACHINE.

Application filed July 28, 1923. Serial No. 654,340.

This invention is for an improvement in loading machines, particularly loading machines of the type shown in my Patent No. 1,445,332 of February 13, 1923, and constitutes an improvement thereon.

In my patent above referred to, I have described a machine including a supporting frame having an inclined chute thereon, in which operates a reciprocable or other suitable conveyor. Carried at one side of the supporting structure is an arm which may swing in an arc about a vertical pivot and on which is a reciprocable carriage carrying a scoop that is pivotally connected therewith. By means of a pair of reversible power driven drums, the scoop carriage is reciprocated along the arm, and the scoop is caused to oscillate, so as to ride past the coal in one direction and scoop it toward the conveyor when being hauled in the opposite direction.

In my said patent, it was proposed to swing the arm manually and to hold it in place by means of jacks.

The present invention has for its principal object to provide a tractor head at the outer end of the cam to facilitate movement of the arm, and to provide automatic means under manual control for driving a tractor wheel in said head.

Another important object of the present invention is to provide an automatic latch for holding the carriage and scoop against movement toward the conveyor until the scoop has swung out into gathering position, this mechanism to replace the hand brake described in my prior patent for this purpose.

These and other objects and advantages are obtained by my invention as shown in the accompanying drawings. In the drawings, Fig. 1 is a plan view of the assembled machine;

Fig. 2 is a detail sectional view of the scoop carriage showing the automatic latch;

Figure 3:
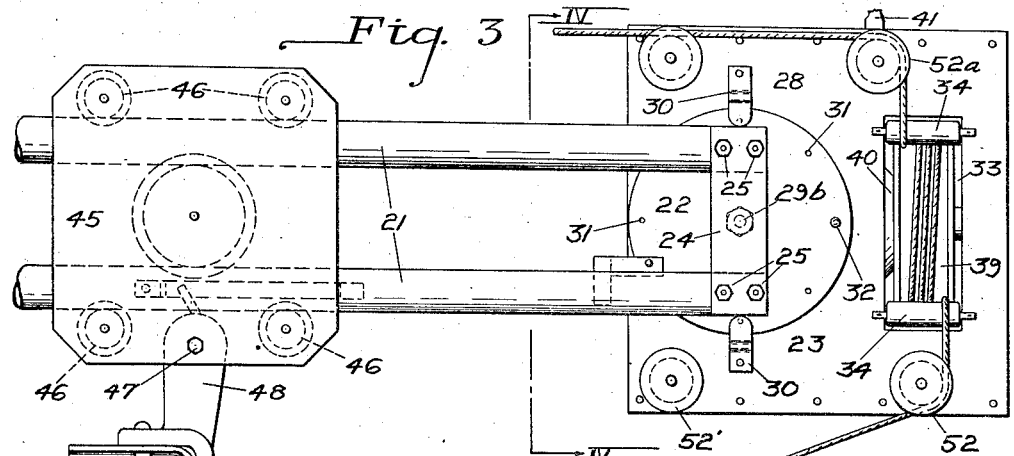
Fig. 3 is a plan view, on a larger scale than Fig. 1, of the scoop arm including the carriage and tractor head.
Figure 4:
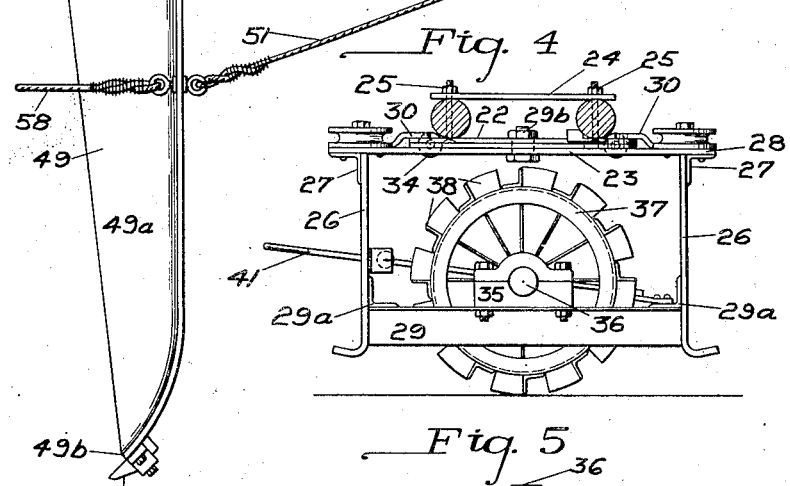
Fig. 4 is a section in the plane of line IV—IV of Fig. 3.
Figure 5:
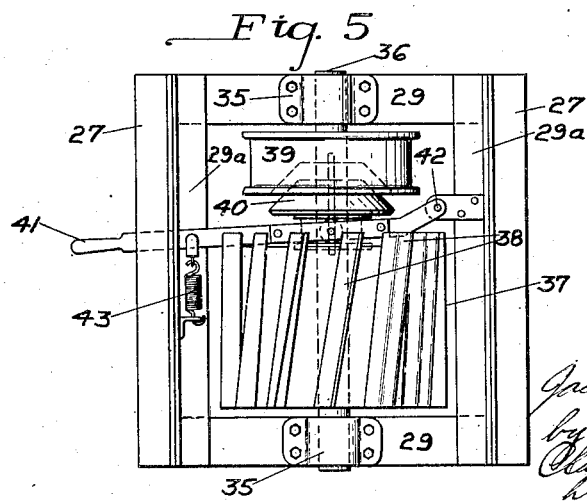
Fig. 5 is a top view of the tractor head, with the top cover plate removed.

The structure of the main body of the machine and the method of operation are generally similar to that shown and described in my said patent, and therefore will not be referred to with great detail herein.

In the drawings, 5 designates the wheeled loading machine frame on which is the conveyor or loading chute 6 which is inclined toward the front of the machine, but horizontal at the rear end.

Slidably guided in this chute is a pusher, comprising a flat plate 8 having a pivoted lower end 9 which may be opened out flat or which may be raised to a position perpendicular to plate 8. This arrangement is slightly different from that shown in my said patent. Connected to the outer end of hinged plate 9 at 11 is a cable 10 adapted to extend up the chute and over a sheave 12 at the rear end of the chute, around guide sheaves 13, and onto drum 14. To avoid confusion, this cable has not been outlined except immediately adjacent the pusher. Also attached to plate 9 at 11 is a cable 10$^a$ which is adapted to pass over a sheave 15 on the end of the chute and around guide sheaves 16 onto drum 14$^a$. This cable is shown in the drawings at the point where it is passed about the guide sheaves.

The drum mechanism is the same as that described in my aforesaid patent, and is driven by motor 17. The arrangement is such that both drums may be in neutral position, or may be alternately driven, as for instance, when drum 14 is being driven drum 14$^a$ is running free, and vice versa, as fully described in my said patent.

With the pusher shown, when drum 14 is operated, cable 10 draws hinged plate 9 up to a vertical position, past which it may not move, and then the entire plates 8 and 9 are moved up the chute, moving the coal therealong, and dumping it off the upper end thereof into a car, not shown. Upon the drum 14$^a$ being operated, plate 9 is first swung down flat and then the pushers move down. As the plate 9 is opened out flat as the pusher moves down, it may be forced under a pile of coal or other material to be loaded.

Slidably mounted at one side of the machine, as described in my said patent, is an arm carrying member 20, from which extends the scoop carrying arm, this arm being of the construction described in the said patent and including parallel tubes 21 secured at their outer ends to a turntable 22 on the tractor head 23 by means of cross bar 24 and bolts 25.

The tractor head 23 is constructed of suitable frame members including legs 26, upper cross angles 27, top plate 28, and lower cross angles 29 and 29ª. The turntable 22 is secured to the top plate 28 by means of a central bolt 29ᵇ, cleats 30 being employed at suitable points around the table to resist any tendency of the table to rock. The table may be provided with holes 31 through any one of which a pin 32 may pass, this pin also passing through an opening in the top plate. Thus, the head may be turned at any suitable angle to the arm or turntable, and held at such angle by the removable pin.

In the plate 28 is a transversely elongated opening 33, at each end of which, above the plate, are rollers 34.

Carried on the lower cross angle bars 29 are bearings 35 for a longitudinally extending shaft 36. This shaft has fixed thereon a tractor wheel 37, with tread cleats 38. Loose on the shaft is a drum 39, and splined to the shaft is a movable clutch member 40 for transmitting motion from the drum to the tractor wheel, when desired, when the drum is being rotated in the manner hereinafter described.

Clutch member 40 is operated by a lever 41 pivoted at 42 to a bracket on angle bar 29ª, and normally urged out into inoperative position by a spring 43. When in inoperative position, the lever is drawn toward the tractor wheel and extends between the ends of cleats 38, these cleats being purposely extended beyond the side of the wheel flange. When so positioned between two cleats, the lever acts as a positive lock to prevent rotation of the tractor wheel to any appreciable extent.

Reciprocable along the two rods or tubes 21 forming the loading arm is a carriage 45 comprised of upper and lower plates, between which are guide rollers 46. Supported on this carriage by means of pin or pivot 47 is a short arm 48 which carries a scoop 49 having a curved bottom part 49ª and an outer edge 49ᵇ, along which may be secured teeth 50.

Fastened to the outer or rear side of the scoop is a cable 51 passing over guide roller 52 on plate 28, over roller 34, around drum 39, over the other roller 34, and over guide sheaves 52ª. A guide sheave 52' may also be mounted on plate 28, with which the cable may at times contact. The cable runs over sheave 55 on the inner end carrying member 20 and around sheaves 56 on the frame to drum 57 on the same shaft as drum 14.

Fastened to the inner face of the scoop is a cable 58 that goes over sheaves 59 on member 20, then around sheaves 60 on the frame onto drum 57ª on the same shaft as drum 14ª. Drums 57 and 57ª, like drums 14 and 14ª, may be alternately driven.

When drum 57 is operating, the scoop is drawn rearwardly until it is nearly parallel with rods 21, and then the whole carriage moves out. When the carriage reaches its outermost limit, drum 57ª is driven, and the scoop is swung outwardly to the position shown in Fig. 1, and then the carriage moves along, and the scoop gathers the coal in toward the end of the conveyor. By rapidly alternating the driving of drums 57 and 57ª, the scoop may be swung back and forth in an arc without the carriage being moved, whereby lumps of coal may be struck very forceful blows, and thus broken up.

When the carriage is in its outermost position and drum 57ª is operated, the carriage has a tendency to move before the scoop has swung out into gathering position. In my prior patent, I have shown a brake for preventing this.

According to the present invention, a leaf spring 61 is mounted on the lower plate of the carriage, the spring having a free outer end which, by the resiliency of the spring, is urged upwardly, the end of the spring having a barb or latch portion 62.

On the turntable 22 is a projecting member 63 having a latch part 64. On the pivoted scoop carrying arm 48 is an inwardly extending pin 65 that rides over the leaf spring 61. When the scoop is swung around to a nearly parallel or feathered position, this pin allows the outer free end of the spring to project up. When the scoop swings out into gathering position, it depresses the spring.

When the carriage moves into its outermost position, the scoop is retracted or feathered so that the spring is not depressed by pin 65. Consequently, latch 62 hooks under latch 64.

Now, when tension is put on cable 58, the carriage is locked against inward movement and the scoop necessarily begins to swing. When the scoop has swung out into scooping position, pin 65 forces spring 61 down, thereby releasing the two cooperating latch members, so that the carriage may move inwardly.

It will be seen that when the carriage moves in either direction, the drum 39 is rotated by cable 51. If it is desired to move the outer end of the loading arm, as is necessarily the case when the machine is in operation, lever 41 may be operated to actuate the clutch and thereby cause the tractor wheel to be rotated to move the loading arm, the direction of movement of the scoop determining the direction in which the tractor wheel is rotated.

The weight of the loading arm and tractor head is normally enough to prevent the tractor wheel from moving, but the lever provides a brake which positively holds the tractor wheel.

The mechanism described is extremely simple and is relatively inexpensive, and is designed to materially facilitate the manipulation of the loader.

Various changes may be made in the construction of the machine within the contemplation of my invention and under the scope of the appended claims.

What I claim is:

1. The combination with a loading machine having a horizontally extending vertically pivoted loading arm, of a supporting frame at the outer end thereof, a tractor wheel for the supporting frame, and a brake for locking the tractor wheel against rotation to fix the loading arm against movement about its pivot.

2. The combination with a loading machine having a horizontally extending loading arm, of a supporting frame pivotally connected with the outer end of the arm, and a movement-imparting tractor wheel in the supporting frame.

3. The combination with a loading machinge having a horizontally extending loading arm, of a tractor head pivotally supporting the outer end of the arm, and power operated driving means for propelling the tractor head.

4. The combination with a loading machine having a horizontally extending loading arm, gathering mechanism associated with the arm, a driving means for the gathering mechanism, a flexible drive connection between the driving means and the gathering mechanism, of a wheeled support for the outer end of the arm, and means engaged by said flexible driving connection for propelling the wheeled support.

5. The combination with a loading machine having a horizontally extending loading arm, a power driven gathering mechanism associated with the arm, a supporting frame on the arm, a tractor wheel for said frame, and means driven through the gathering mechanism for transmitting power to said tractor wheel.

6. The combination with a loading machine having a horizontally extending loading arm, a power driven gathering mechanism associated with the arm, a supporting frame pivotally connected with the arm, a tractor wheel for said frame, and means driven through the gathering mechanism for transmitting power to said tractor wheel.

7. The combination with a loading machine having a horizontally extending loading arm, a gathering mechanism associated with the arm, a power drive for the gathering mechanism, a driving connection between the drive and the gathering mechanism, a supporting frame at the outer end of the arm, a tractor wheel for said frame, means driven through said driving connection for transmitting power to said tractor wheel, clutch mechanism for controlling the operation of the tractor wheel, and means providing a brake for the tractor wheel.

8. The combination with a loading machine having a horizontally extending loading arm, a power driven gathering mechanism associated with the arm, a supporting frame at the outer end of the arm, a tractor wheel for said frame, means driven through the gathering mechanism for transmitting power to said tractor wheel, and a combined clutch and brake mechanism for controlling the transmission of power to the tractor wheel or for holding the tractor wheel against rotation.

9. The combination with a loading machine having a horizontally extending loading arm, a carriage movable along the arm, gathering means carried by the carriage, cables for effecting the operation of the gathering means, of a support for the arm, a tractor in the support, and means engaged by one of said cables for transmitting motion to the tractor through the operation of the gathering means.

10. The combination with a loading machine having a horizontally extending loading arm, a carriage movable along the arm, gathering means carried by the carriage, cables for effecting the operation of the gathering means, of a support for the outer end of the arm, a tractor for the support, a drum on the support over which one of said cables is passed and guided, whereby the drum may be rotated upon movement of the cable, and means including a manually operable clutch for transmitting motion from the drum to the tractor.

11. A loading machine having a horizontally extending vertically pivoted loading arm, a carriage reciprocable along the arm, a scoop carried by the carriage, means for reciprocating the carriage and scoop, a supporting frame for arm, a tractor for the supporting frame, and power driven means for operating the tractor.

12. A loading machine having a horizontally extending loading arm, a carriage reciprocable along the arm, a scoop carried by the carriage, cables for moving the scoop and carriage along the arm, power driven drums for the cables, a supporting frame for the outer end of the arm, a tractor for the supporting frame, and means driven by one of said cables for operating the tractor.

13. A loading machine having a horizontally extending loading arm, a carriage reciprocable along the arm, a scoop carried by the carriage, cables for moving the scoop and carriage along the arm, power driven drums for the cables, a supporting frame for the outer end of the arm and pivotally connected therewith, means for normally holding the frame against pivotal movement, a tractor for the supporting frame, and means driven by one of said cables for operating the tractor.

14. A loading machine having a horizontally extending loading arm, a carriage reciprocable along the arm, a scoop carried by the carriage, cables for moving the carriage back and forth along the arm, power driven drums for the cables, a supporting frame pivotally connected with the outer end of the arm, a shaft in the supporting frame, a drum on the shaft, means on the frame for guiding one of said cables over the drum, a tractor wheel on the shaft, and a clutch interposed between the drum and shaft.

15. A loading machine having a horizontally extending loading arm, a carriage reciprocable along the arm, a scoop pivotally mounted on the carriage, cables for oscillating the scoop and moving the carriage, means at opposite ends of the arm for guiding the cables, a latch positioned near one end of the arm, a latch member on the carriage for cooperation therewith, and latch releasing means, said latching means tending to hold the carriage against movement.

16. A loading machine having a horizontally extending loading arm, a carriage reciprocable along the arm, a scoop pivotally mounted on the carriage, cables for oscillating the scoop and moving the carriage, means at opposite ends of the arm for guiding the cables, a latch positioned near one end of the arm, a latch member on the carriage for cooperation therewith, and means mounted to swing with the scoop for moving the latch member on the carriage to releasing position when the scoop is in a predetermined position, whereby the carriage may be held against movement in one direction when the respective latching means are engaging each other until the scoop has assumed a predetermined position.

In testimony whereof I affix my signature.

JACOB M. LONDON.